(12) United States Patent
Holmes et al.

(10) Patent No.: US 8,251,166 B2
(45) Date of Patent: Aug. 28, 2012

(54) HYBRID POWERTRAIN WITH ASSISTED STARTING AND METHOD OF STARTING AN ENGINE

(75) Inventors: Alan G. Holmes, Clarkston, MI (US); Steven Lee Hayslett, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 464 days.

(21) Appl. No.: 12/430,176

(22) Filed: Apr. 27, 2009

(65) Prior Publication Data

US 2010/0270096 A1 Oct. 28, 2010

(51) Int. Cl.
*B60W 10/06* (2006.01)
(52) U.S. Cl. ............ 180/65.28; 180/65.265; 180/65.275
(58) Field of Classification Search ................ 180/65.28, 180/65.21–65.285
See application file for complete search history.

(56) References Cited

U.S. PATENT DOCUMENTS

| | | | | |
|---|---|---|---|---|
| 5,115,773 | A  * | 5/1992 | Morishima | 123/179.24 |
| 7,278,940 | B2 | 10/2007 | Tata et al. | |
| 2004/0232702 | A1* | 11/2004 | He | 290/31 |
| 2006/0027201 | A1* | 2/2006 | Ono | 123/179.25 |

* cited by examiner

*Primary Examiner* — Jeffrey J Restifo
*Assistant Examiner* — Erez Gurari
(74) *Attorney, Agent, or Firm* — Quinn Law Group, PLLC

(57) ABSTRACT

A hybrid powertrain for a vehicle is provided that includes an engine having a crankshaft and a motor/generator operatively connected to the crankshaft. An elastic member is operatively connected to the crankshaft and configured to be wound by one of the engine or the motor/generator. A one-way torque-transmitting mechanism is operatively connected to a first end portion of the elastic member and configured to overrun prior to winding of the elastic member. The elastic member is configured to be releasable to allow unwinding of the elastic member to rotate the crankshaft to restart the engine. A method of starting an engine on a hybrid vehicle is also provided.

14 Claims, 5 Drawing Sheets

HYBRID POWERTRAIN WITH ASSISTED STARTING AND METHOD OF STARTING AN ENGINE

TECHNICAL FIELD

The invention relates to a hybrid powertrain and a method of starting an engine of a hybrid powertrain.

BACKGROUND OF THE INVENTION

Hybrid powertrains typically include an engine and at least one electric motor/generator used for vehicle propulsion, regenerative vehicle braking or both. The electric motor/generator is also typically used for quickly restarting the engine, to eliminate idle time with the engine running but not providing propulsion. In some hybrid powertrains, the electric motor/generator may restart the engine while also providing vehicle propulsion, so that the electric motor/generator must then have sufficient torque and power capacity to accomplish both simultaneously. If, instead, the full torque or power capacity of the electric motor/generator or motor/generators, or the full electric current or electric power capacity of other components, were used to propel the vehicle, then the extra torque or power from engine starting would be diverted from vehicle propulsion and would produce a momentary disruption in vehicle propulsion.

Electrically-variable transmissions typically have an input member, an output member, and two electric motor/generators connected to different members of planetary gear sets. Including clutches allows one or more electrically-variable modes of operation, fixed speed ratio modes, and an electric-only (battery-powered) mode. Electrically-variable transmissions may improve vehicle fuel economy in a variety of ways, primarily by using one or both of the motor/generators for vehicle braking and using the regenerated energy to power the vehicle electrically, with the engine off. The engine may be turned off at idle, during periods of deceleration and braking, and during periods of low speed or light load operation to eliminate efficiency losses due to engine drag. Braking energy captured via regenerative braking (or electrical energy generated during periods when the engine is operating) is utilized during these engine-off periods. Transient demand for engine torque or power is supplemented by the motor/generators during operation in engine-on modes, allowing for a smaller engine without reducing vehicle performance. Additionally, the electrically-variable modes may allow the engine to be operated at or near the optimal efficiency point for a given power demand.

To transition from an electric-only operating mode to an electrically-variable operating mode, the engine must be restarted. In an electrically-variable transmission, or other two-motor hybrid, this may be accomplished by using one motor/generator or a combination of both motor/generators to restart the engine.

SUMMARY OF THE INVENTION

A hybrid powertrain is provided with assisted starting of the engine in order to minimize or eliminate torque and/or power required by the motor/generator or motor/generators to start or restart the engine.

Accordingly, a hybrid powertrain for a vehicle includes an engine having a crankshaft. A motor/generator is operatively connected to the crankshaft. In some embodiments, the powertrain includes two motor/generators, such as in a power-split arrangement. An elastic member, such as a spring, is operatively connected to the crankshaft and is configured to be wound by the engine in some embodiments and by the motor/generator in other embodiments. A one-way torque-transmitting mechanism, referred to as a one-way brake, is operatively connected to a first end portion of the elastic member and is configured to overrun prior to winding of the elastic member. The elastic member is releasable to allow unwinding of the elastic member so that torque of the elastic member will assist in rotating the crankshaft to restart the engine.

A selectively engagable brake may be operatively connected to a second end portion of the elastic member and is selectively engagable to ground the second end portion to a stationary member, thereby holding the wound elastic member at engine shutoff. Engine friction and compression may assist in holding the elastic member, or may be sufficient to hold the elastic member in lieu of a brake.

A method of starting an engine on a hybrid vehicle having an engine and at least one motor/generator includes winding an elastic member operatively connected to a crankshaft of the engine using torque provided by one of the engine and the motor/generator. The method includes releasing the wound elastic member to assist in starting the engine.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
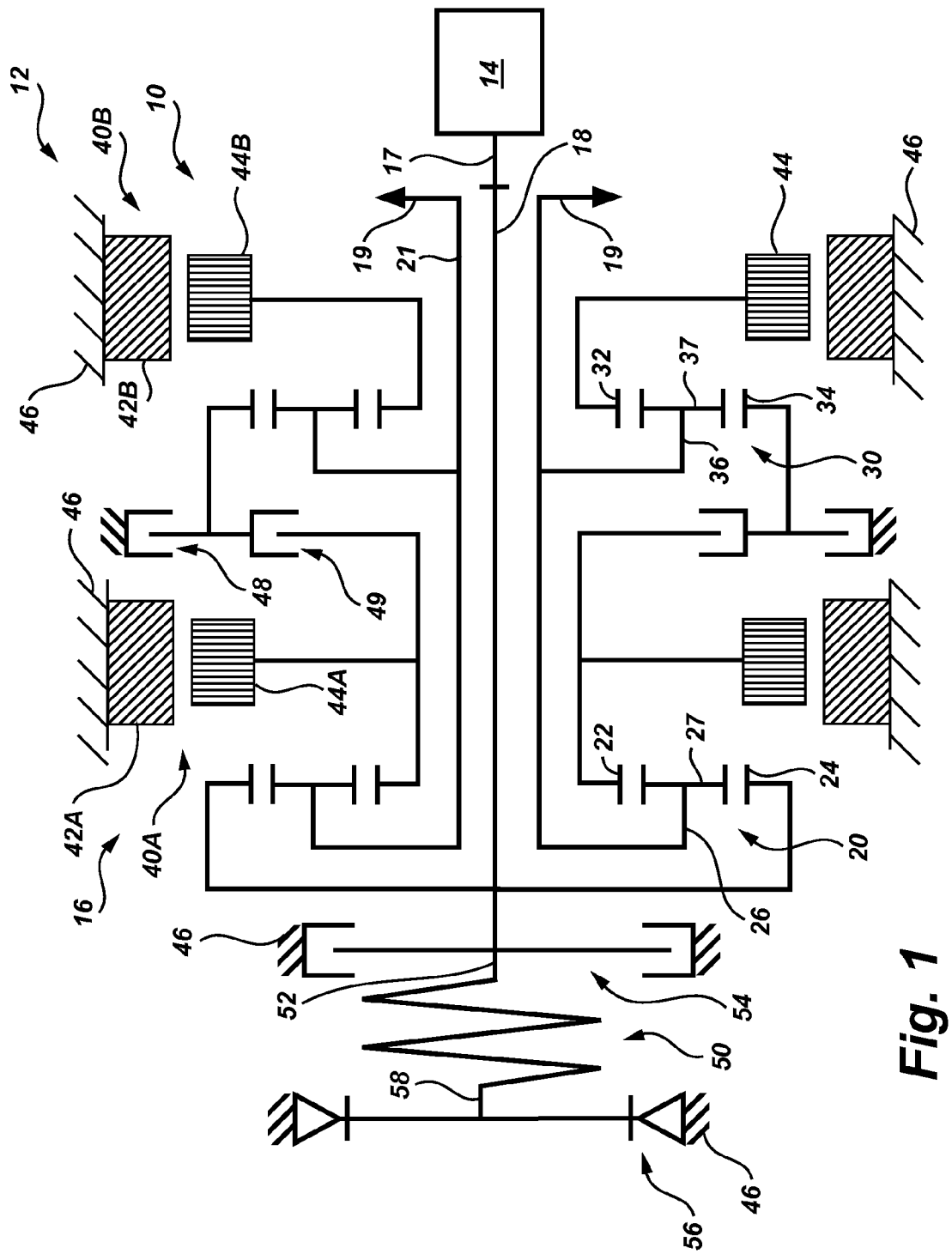
FIG. 1 is a schematic illustration of a first embodiment of a hybrid powertrain for a vehicle.

Referring to the drawings, wherein like reference numbers refer to like components throughout the several views, FIG. 1 illustrates a hybrid powertrain 10 of a vehicle 12. The hybrid powertrain 10 includes an engine 14 connected with a hybrid transmission 16. The engine crankshaft 17 is operatively connected for rotation with an input member 18 of the transmission 16. The transmission 16 also has an output member 19 connected to wheels of the vehicle via a final drive mechanism, not shown.

The transmission 16 includes a transmission gearing arrangement, namely first planetary gear set 20 and second planetary gear set 30. The first planetary gear set 20 includes a sun gear member 22, a ring gear member 24, and a carrier member 26 that rotatably supports pinion gears 27 that mesh with both the sun gear member 22 and the ring gear member 24. The second planetary gear set 30 includes a sun gear member 32, a ring gear member 34, and a carrier member 36 that rotatably supports pinion gears 37 that mesh with both the sun gear member 32 and the ring gear member 34.

The transmission 16 further includes a first motor/generator 40A and a second motor/generator 40B. Each motor/generator 40A, 40B includes a respective stator 42A, 42B and rotor 44A, 44B. The stators 42A, 42B are grounded to a stationary member 46 and are operatively connected to an energy storage device (not shown), such as a battery, and to a controller (not shown) for controlling operation of the motor/generators 40A, 40B as motors, by directing stored electrical energy to the stators, typically via a power inverter, and as generators by converting rotational torque of the rotors 40A, 40B into stored electrical energy.

The transmission 16 is configured as a power-split transmission. The input member 18 is connected to the ring gear member 24 of the first planetary gear set 20, while the rotor 44A is connected for rotation with the sun gear member 22. The output member 19 is connected for rotation with the carrier member 36 of the second planetary gear set 30 via a shaft 21 concentric with the input member 18, and the sun gear member 32 is connected for rotation with the rotor 44B.

The transmission 16 includes a first torque-transmitting mechanism 48, in the form of a brake, which is selectively engagable via the controller to ground the ring gear member 34 to the stationary member 46. The transmission 16 further includes a second torque-transmitting mechanism 49, in the form of a clutch, which is selectively engagable via the controller to connect the sun gear member 22 and the rotor 44A for common rotation with the ring gear member 34.

The hybrid powertrain 10 is operable in multiple modes, the selection of which is dependent upon vehicle operating conditions such as accelerator position, brake pedal position, wheel speed, etc. For example, a first fixed ratio operating mode is established when the engine 14 is providing torque to the input member 18, the motor/generators 40A, 40B are idle, and the torque-transmitting mechanisms 48 and 49 are engaged. A first electric-only operating mode is established when the engine 14 is off, the motor/generator 40B is acting as a motor to provide torque to the output member 19 via the second planetary gear set 30, while motor/generator 40A is idle and with torque-transmitting mechanism 48 engaged. A second electric-only operating mode is established when an input brake 54 is engaged to ground the input member 18 and crankshaft 17 to the stationary member 46, and motor/generator 40A is controlled to provide torque to the output member 19 through the first planetary gear set 20. A first electrically-variable operating mode is established when the engine 14 provides torque to the input member 18, the motor/generators 40A, 40B are controlled to operate as motors or generators, and only the torque-transmitting mechanism 48 is engaged. The first electrically-variable operating mode is an input-split mode. A second electrically-variable operating mode is established when the engine 14 provides torque to the input member 18, and the motor/generators 40A, 40B are controlled to operate as motors or generators, and only the torque-transmitting mechanism 49 is engaged. The second electrically-variable mode is a compound-split mode. An electric-only reverse operating mode is established by engaging torque-transmitting mechanism 48 and controlling motor/generator 40B to operate as a motor to turn the output member 19 in a reverse direction.

An elastic member, which in this embodiment is a torsion spring 50, is operatively connected to the input member 18 and crankshaft 17. A first end portion 52 of the spring is connected for rotation with the input member 18 and crankshaft 17. The selectively engagable input brake 54 may be engaged via a controller to ground the first end portion 52, the input member 18 and the crankshaft 17 to the stationary member 46. A one-way torque-transmitting mechanism 56, which may be referred to as either a one-way clutch or a one-way brake, permits rotation of a second end portion 58 of the spring 50 when the engine crankshaft 17 and input member 18 rotate in a forward direction consistent with forward propulsion of the vehicle, but locks to ground the second end portion 58 to the stationary member 46 when the input member 18 and crankshaft 17 attempt to rotate in a reverse direction and/or when reaction torque is applied in the reverse direction to the one-way torque-transmitting mechanism 56.

The spring 50 is utilized to provide spring torque to assist in starting the engine 14, either when a shift from the electric-only mode to an electrically-variable operating mode is warranted, or during a cold start of the engine 14. Specifically, in order to start the engine 14 to enable a shift from the electric-only operating mode (in which motor/generator 40B is providing torque to the output member 19 with torque-transmitting mechanism 48 engaged) to either of the electrically-variable operating modes, torque from the previously wound spring 50 may be used to assist in rotation of the input member 18 and crankshaft 17 to start the engine 14.

The spring 50 may be wound using motor torque. The vehicle 10 may be propelled by the engine 14 with the one-way clutch 56 overrunning and the input brake 54 disengaged. Light braking may be signaled via a pedal command (i.e. a depression of the brake pedal sending a signal to the controller). One or both of the motor/generators 40A, 40B may then be controlled to operate as generators, converting torque of the output member 19 into stored electrical energy, and thereby slowing and eventually stopping both the input member 18 and engine crankshaft 17. Alternatively, or in addition, the input brake 54 may be applied to slow and eventually stop the input member 18 and engine crankshaft 17. When the vehicle 10 slows enough, regenerative braking is no longer merited, and friction brakes on the wheels (not shown) may be used to stop the vehicle. Regenerative braking may also cease when the pedal command changes to diminish or eliminate regenerative braking.

With the vehicle sufficiently slowed, the input brake 54 does not need to be engaged to keep the crankshaft 17 from rotating forward, and the motor/generator 40A is operated as a motor to turn the input shaft 18 and the first end portion 52 of the spring 50 backward (i.e., to rotate in a direction opposite of that used for forward vehicle propulsion). Because the second end portion 58 is grounded due to the locked one-way torque-transmitting mechanism 56, the spring 50 will be wound backward relative to the forward rotation of the crankshaft 17. With the spring 50 thus wound, the input brake 54 can be reengaged to hold the wound spring 50, while one or both motor/generators 40A, 40B provide torque to propel the vehicle forward. Engine friction and compression may also contribute to holding the wound spring, and, if sufficient, may make the input brake 54 unnecessary.

When vehicle operating conditions, such as vehicle speed or pedal command, indicate that the engine 14 should be restarted, the motor/generators 40A, 40B are controlled to prevent placing backward torque on the input brake 54, and the input brake 54 is released, releasing the wound spring 50. The spring 50 unwinds in the forward direction, causing the engine crankshaft 17 to spin forward, assisting in starting the engine 14 with lessened or no forward torque provided by the motor/generators 40A, 40B. For example, if the powertrain 10 is operating in the first electric-only operating mode with motor/generator 40B acting as a motor to power the output member 19 and with torque-transmitting mechanism 48 engaged, when the input brake 54 is released, the wound spring 50 will provide torque to the input member 18 to start the engine 14 using reaction torque from the engaged one-way brake 56 with little or no torque from motor/generator 40B being necessary to provide reaction torque and little or no torque from motor/generator 40A. Thus, peak power loads on the powertrain 10 during engine starting are minimized. Motor/generator 40B can be used exclusively for propulsion during critical conditions, such as with a throttle tip-in (i.e., a demand for vehicle acceleration indicated by pressure on the accelerator pedal) during engine starting.

Figure 2:
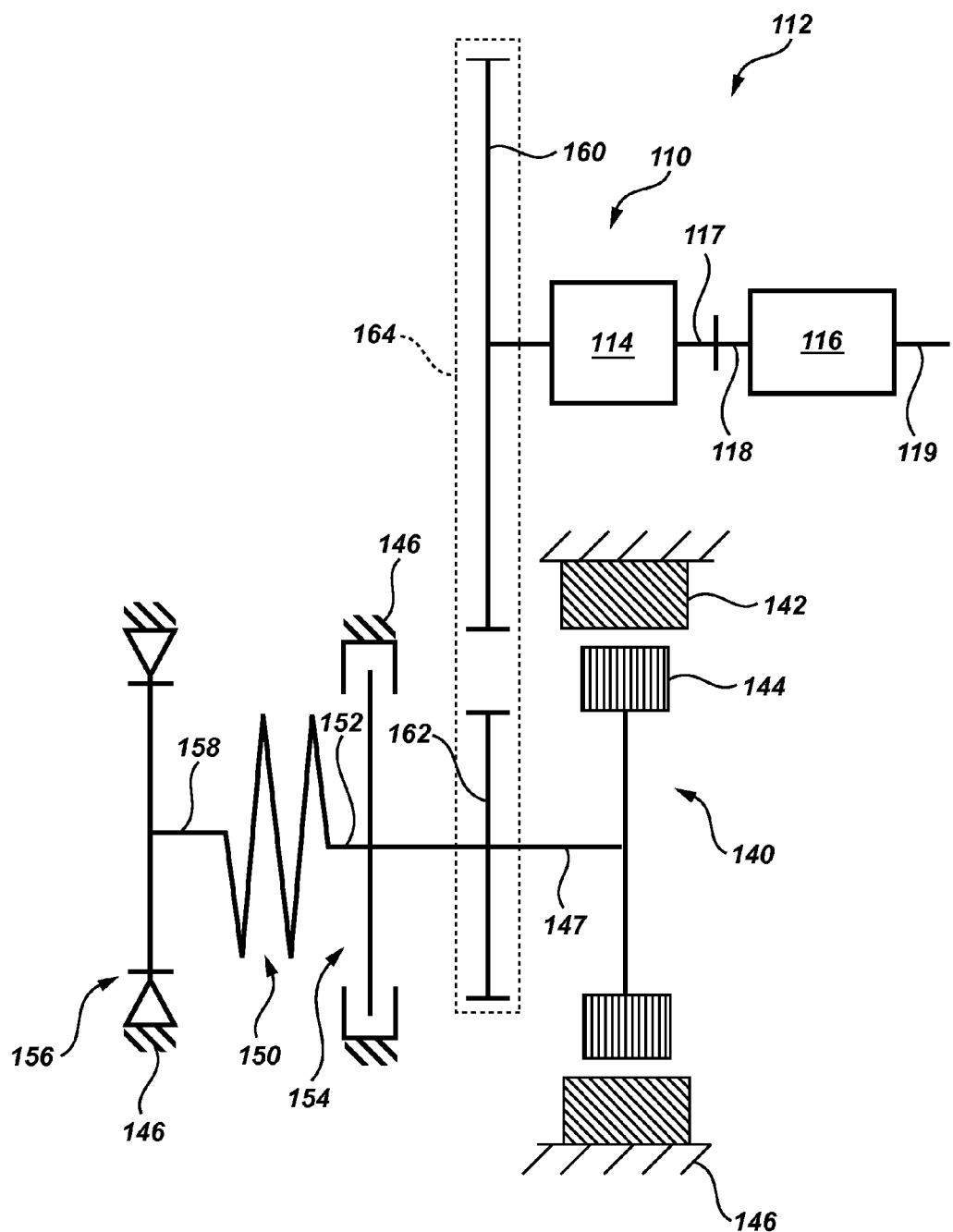
FIG. 2 is a schematic illustration of a second embodiment of a hybrid powertrain for a vehicle.

Referring to FIG. 2, another embodiment of a hybrid powertrain 110 for a vehicle 112 is shown. The powertrain 110 includes an engine 114 with a crankshaft 117 operatively connected for rotation with an input member 118 of a transmission 116 also having an output member 119 that delivers driving torque to wheels, such as through a final drive mechanism (not shown). The transmission 116 may be a mechanical transmission or an electromechanical hybrid transmission, having one or more additional motor/generators (not shown) in addition to a mechanical gearing arrangement. The powertrain 110 is a belt-alternator system (BAS)-type powertrain, as a motor/generator 140 is operatively connected to the engine crankshaft 117 via a motor shaft 147, rotatable elements 160, 162 and an endless rotatable device 164. The endless rotatable device 164 and rotatable elements 160, 162 transfer torque between the crankshaft 117 and the motor shaft 147. The rotatable elements 160, 162 may be sprockets, in which case the endless rotatable device 164 is a chain, or pulleys, in which case the endless rotatable device 164 is a belt.

The motor generator 140 includes a stator 142 grounded to a stationary member 146 and a rotor 144 rotatable with motor shaft 147. The rotatable element 162 rotates with the motor shaft 147. The rotatable element 160 rotates with the crankshaft 117. The rotatable elements 160, 162 rotate in the same direction as one another and as the engine crankshaft 117 and the motor shaft 147, due to the endless rotatable device 164. The rotatable elements 160, 162 may be of different sizes so that the crankshaft 117 rotates at a different speed than the motor shaft 147. In FIG. 2, the rotatable element 160 is larger than rotatable element 162 so that the motor shaft 147 rotates at a faster speed than the crankshaft 117. Alternatively, the rotatable element 162 may be larger than rotatable element 160 so that the crankshaft 117 rotates faster than the motor shaft 147.

The motor/generator 140 is used to start the engine 114, either from a standing start (i.e., when the vehicle is not moving), or, if the transmission 116 is a hybrid transmission, to restart the engine 114 when switching from an electric-only operating mode to an operating mode in which the engine 114 provides torque.

An elastic member, which in this embodiment is a torsion spring 150, is operatively connected to the input member 118 and crankshaft 117 via the motor shaft 147, rotatable elements 160, 162 and endless rotatable device 164. A first end portion 152 of the spring is connected for rotation with the motor shaft 147. A selectively engagable input brake 154 may be engaged via a controller to ground a first end portion 152 of the spring 150 to the stationary member 146. This also grounds the engine crankshaft 117 via grounding of the rotatable elements 160, 162 and the endless rotatable device 164. A one-way torque-transmitting mechanism 156, which may be referred to as either a one-way clutch or a one-way brake, permits rotation of a second end portion 158 of the spring 150 when the engine crankshaft 117 and input member 118 rotate in a forward direction consistent with forward propulsion of the vehicle, but grounds the second end portion 158 to the stationary member 146 when the input member 18 and crankshaft 17 attempt to rotate in a reverse direction and/or when reaction torque in a reverse direction is applied to the torque-transmitting mechanism 156.

The spring 150 is utilized to provide spring torque to assist in starting the engine 114, either when a shift from the electric-only mode to an engine-driven or engine-assisted operating mode is warranted, or during a cold start or other standing start of the engine 114. Specifically, in order to start the engine 114, torque from the previously wound spring 150 may be used to assist in rotation of the motor shaft 147 and crankshaft 117 to start the engine 114.

The spring 150 may be wound using motor torque. The vehicle 110 may be propelled by the engine 114, and light braking may be signaled via a pedal command (i.e. a depression of the brake pedal sending a signal to the controller). The motor/generator 140 may then be controlled to operate as a generator, converting torque of the output member 119 into stored electrical energy, and thereby slowing and eventually stopping the input member 118, the engine crankshaft 117 and the motor shaft 147. Alternatively, or in addition, the input brake 154 may be applied to slow and eventually stop the input member 118 and engine crankshaft 117. With the vehicle sufficiently slowed, the input brake 154 does not need to be engaged to keep the crankshaft 117 from rotating forward, and the motor/generator 140 is operated as a motor to turn the motor shaft 147 and the first end portion 152 of the spring 150 backward (i.e., to rotate in a direction opposite of that used for forward vehicle propulsion. Because the second end portion 158 is grounded due to the one-way torque-transmitting mechanism 156, the spring 150 will be wound backward relative to the forward rotation of the crankshaft 117. With the spring 150 thus wound, the input brake 154 can be reengaged to hold the wound spring 150. When vehicle operating conditions, such as vehicle speed, pedal command, or the ignition switch (in the case of a cold start) indicate that the engine 14 should be restarted, the input brake 154 is released, releasing the wound spring 150. The spring 150 unwinds in the forward direction, providing torque causing the engine crankshaft 117 to spin forward via the motor shaft 147 and rotatable device 164 connecting the rotatable elements 160, 162. The motor/generator 140 also provides torque to turn the motor shaft 147 in a forward direction. With the assist of the spring torque for engine starting, the motor/generator 140 may be reduced in size.

Figure 3:
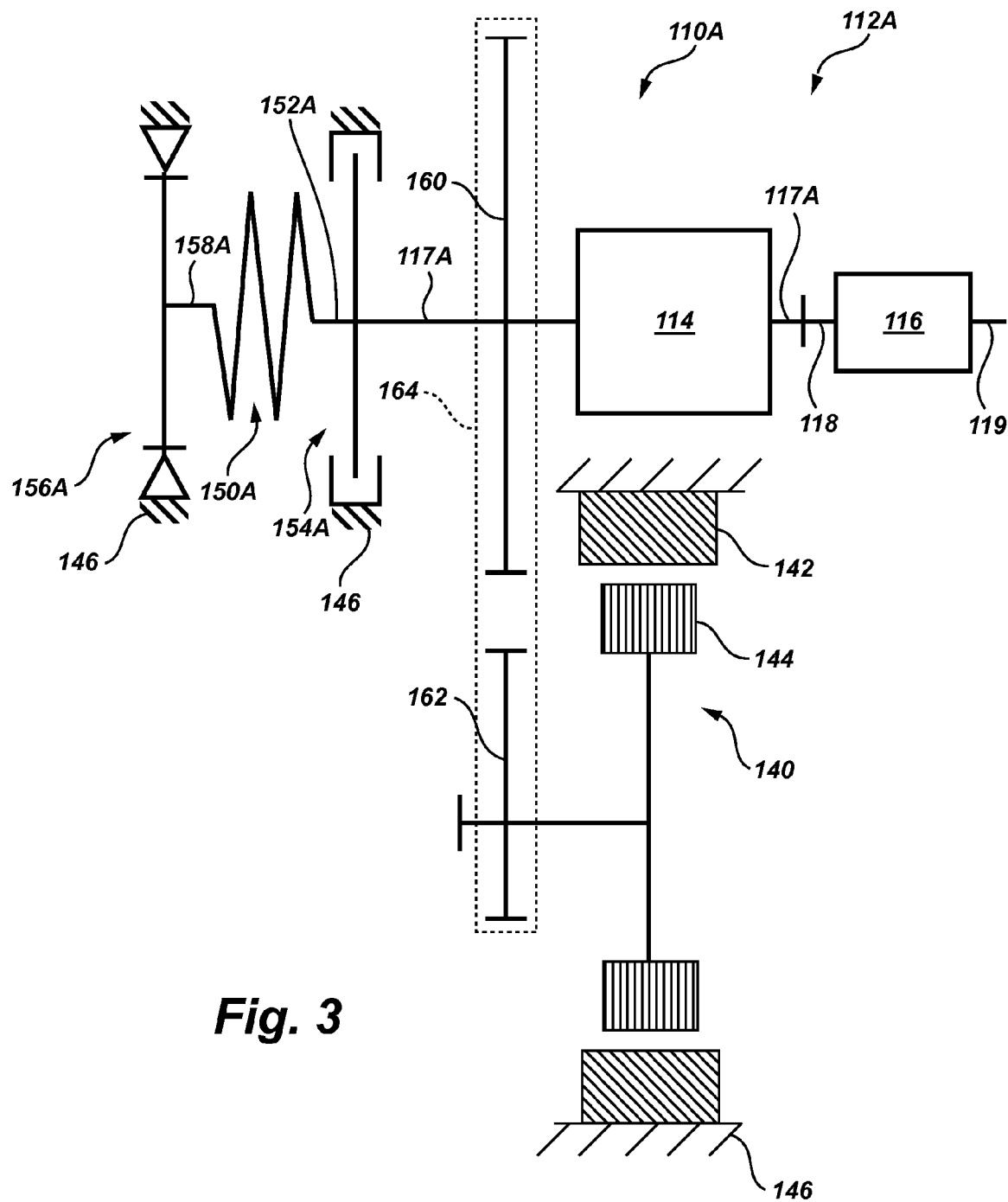
FIG. 3 is a schematic illustration of a third embodiment of a hybrid powertrain for a vehicle.

Referring to FIG. 3, a vehicle 110A with a hybrid powertrain 112A is shown that is alike in every aspect to hybrid powertrain 112 of FIG. 2, except that an elastic member, i.e., a spring 150A, as well as an input brake 154A and one-way torque-transmitting mechanism 156A are mounted on crankshaft 117A, replacing the similar components, spring 150, input brake 154 and one-way torque-transmitting mechanism 156 mounted on motor shaft 147 of FIG. 2. The spring 150A is wound backward after the engine 114 is slowed to a stop, using torque provided by the motor/generator 140. The one-way torque-transmitting mechanism 156A grounds a second end 158A of the spring 150A to the stationary member 146 when the spring 150A is wound backward. The input brake 154A is then engaged to hold the wound spring 150A. To restart the engine 114, the input brake 154A is released, allowing a first end 152A of the spring 150A to unwind, providing torque in the forward direction of rotation, with the second end 158A is locked at the one-way clutch 156A until the spring 150A unwinds, and then overruns so that both ends 158A, 152A rotate forward with the crankshaft 117A. Torque from the motor/generator 140 may also be provided to turn the crankshaft 117A in a forward direction. With the assist of the spring torque on the engine crankshaft 117A, the motor/generator 140 and/or the rotatable elements 160,162 and the endless rotatable device 164 may be reduced in size.

Figure 4:
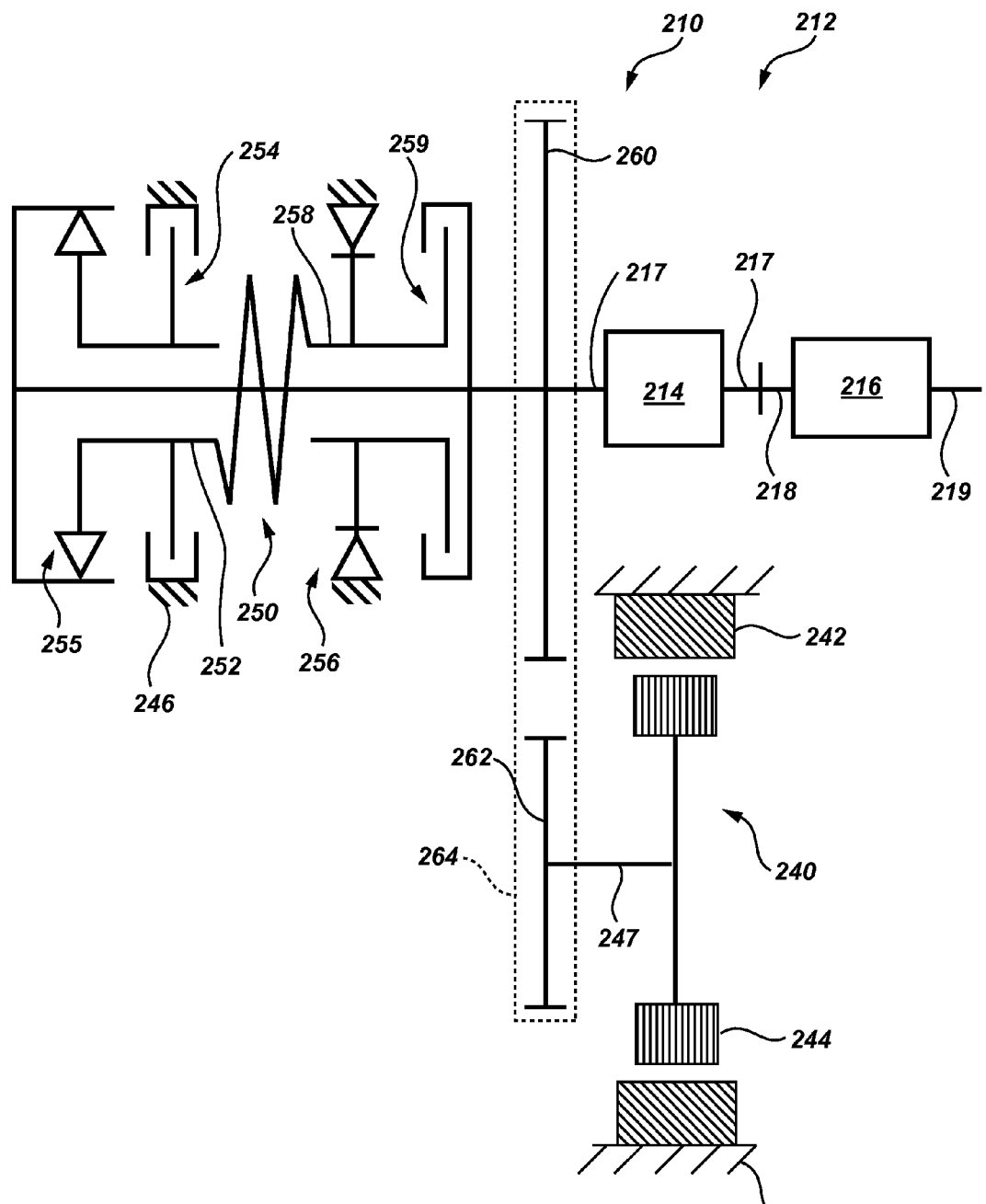
FIG. 4 is a schematic illustration of a fourth embodiment of a hybrid powertrain for a vehicle.

Referring to FIG. 4, another embodiment of a hybrid powertrain 210 for a vehicle 212 is shown. The powertrain 210 includes an engine 214 with a crankshaft 217 operatively connected for rotation with an input member 218 of a transmission 216 also having an output member 219 that delivers driving torque to wheels, such as through a final drive mechanism (not shown). The transmission 216 may be a mechanical transmission or an electromechanical hybrid transmission, having one or more additional motor/generators in addition to a mechanical gearing arrangement. The powertrain 210 is a belt-alternator system (BAS)-type powertrain, as a motor/generator 240 is operatively connected to the engine crankshaft 217 via a motor shaft 247, rotatable elements 260, 262 and an endless rotatable device 264. The endless rotatable device 264 and rotatable elements 260, 262 transfer torque between the crankshaft 217 and the motor shaft 247. The rotatable elements 260, 262 may be sprockets, in which case the endless rotatable device 264 is a chain, or pulleys, in which case the endless rotatable device 264 is a belt.

The motor generator 240 includes a stator 242 grounded to a stationary member 246 and a rotor 244 rotatable with motor shaft 247. The rotatable element 262 rotates with the motor shaft 247. The rotatable element 260 rotates with the crankshaft 217. The rotatable elements 260, 262 rotate in the same direction as one another and as the engine crankshaft 217 and the motor shaft 247, due to the endless rotatable device 264. The rotatable elements 260, 262 may be of different sizes so that the crankshaft 217 rotates at a different speed than the motor shaft 247. In FIG. 4, the rotatable element 260 is larger than rotatable element 262 so that the motor shaft 247 rotates at a faster speed than the crankshaft 217. Alternatively, the rotatable element 262 may be larger than rotatable element 260 so that the crankshaft 217 rotates faster than the motor shaft 247.

The motor/generator 240 is used to start the engine 214, either from a cold start (i.e., when the vehicle is not moving), or, if the transmission 216 is a hybrid transmission, to restart the engine 214 when switching from an electric-only operating mode to an operating mode in which the engine 214 provides torque.

An elastic member, which in this embodiment is a torsion spring 250, is connected with to the crankshaft 217 (i.e., mounted to the crankshaft 217 or to an extension thereof) to selectively rotate commonly with the crankshaft 217 and the input member 218. A selectively engagable brake 254 may be engaged via a controller to ground a first end portion 252 of the spring 250 to the stationary member 246. A one-way torque-transmitting mechanism 255, which may be referred to as a one-way clutch, permits the first end portion 252 to overrun when the crankshaft 217 rotates in a forward direction faster than the first end portion 252. A one-way torque-transmitting mechanism 256, which may be referred to as either a one-way clutch or a one-way brake, overruns to permit rotation of a second end portion 258 of the spring 250 when the second end portion 258 rotates in a forward direction consistent with forward propulsion of the vehicle 212, but locks to ground the second end portion 258 to the stationary member 246 to prevent backward rotation of the second end portion 258. A rotating-type clutch 259 is selectively engagable to connect the second end portion 258 for common forward rotation with the crankshaft 217.

The spring 250 is utilized to provide spring torque to assist in starting the engine 214, either during a standing start of the engine 214, or, assuming the transmission 216 is a hybrid transmission with one or more additional motor/generators, when a shift from the electric-only mode to an engine-driven or engine-assisted operating mode is warranted. The spring 250 is wound in a forward direction using engine torque when the engine 214 is slowed prior to stopping. The motor/generator 240 may operate as a generator to slow the engine 214. The spring 250 is wound by engine torque with the input brake 254 and the clutch 259 engaged, and the one-way clutch 255 and the one-way torque-transmitting mechanism 256 overrunning. The second end portion 258 is wound forward relative to the first end portion 252. When the engine 214 is stopped, the input brake 254 remains engaged and the one-way brake 256 is locked, as they prevent the end portions 252, 258 from rotating backward and hold the wound spring 250. To restart the engine 214, the input brake 254 is disengaged, and the spring 250 unwinds, with the first end portion 252 rotating forward relative to the second end portion 258, with one-way clutch 255 transferring spring torque to the crankshaft 217 to assist the motor/generator 240, which is controlled to act as a motor to also provide torque to the crankshaft 217 to start the engine 214. With the assist of the spring torque, the motor/generator 240 may be reduced in size. If the spring 250 is designed to provide sufficient spring torque, the spring 250 may be used alone to start the engine 214; i.e., the motor/generator 240 may not be needed for starting the engine 214. With the spring 250 mounted to the crankshaft 217, the endless rotatable device 264 does not bear the entire starting load, making cold starting of the engine 214 via the spring 250 more feasible than if torque (whether spring torque or motor torque) is transferred to the crankshaft 217 via the endless rotatable device 264.

Alternatively, the embodiments shown in FIGS. 3 and 4 could be constructed with the motor/generator mounted directly on the engine crankshaft. Still further, the motor/generator could be a part of the transmission.

Figure 5:
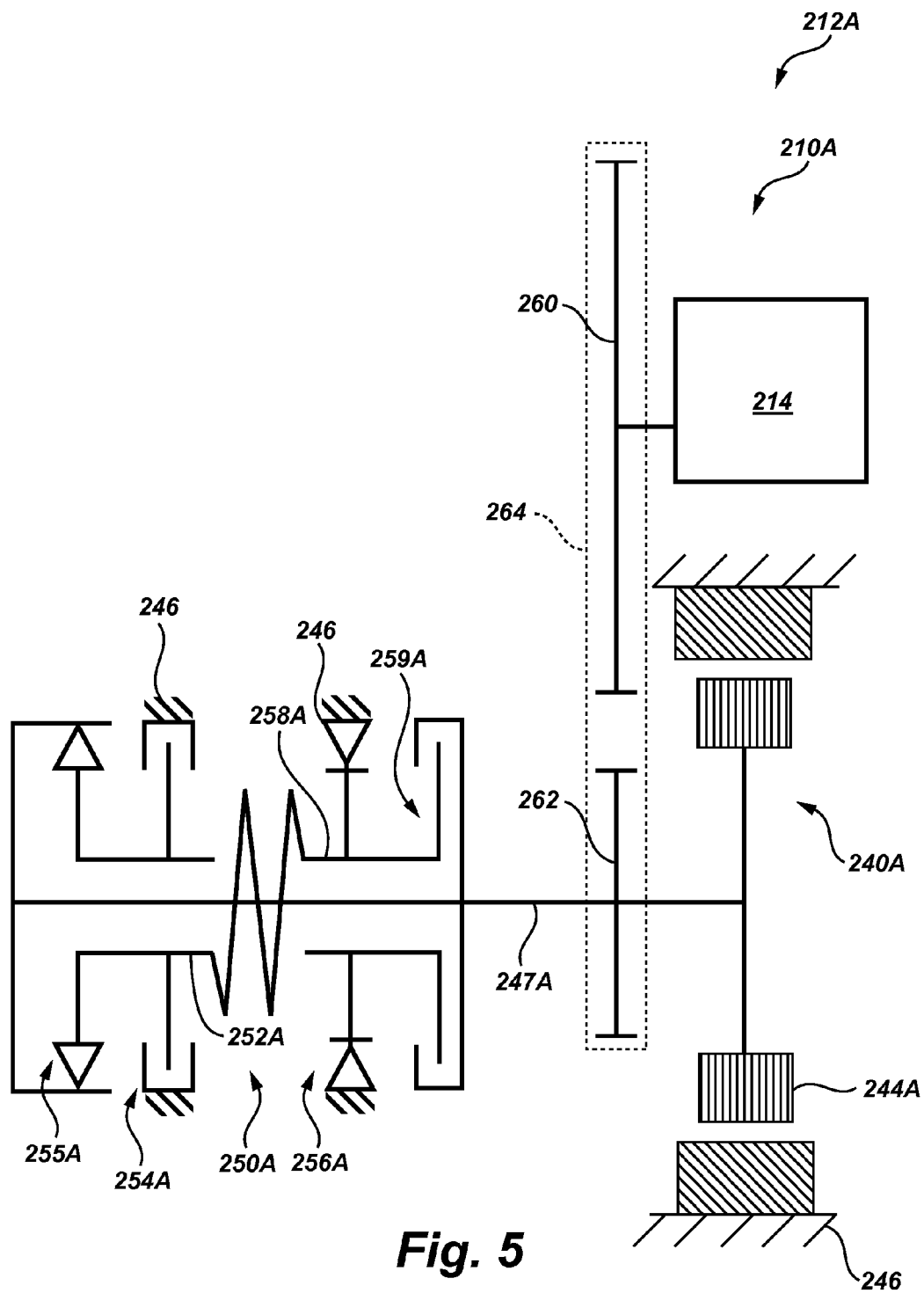
FIG. 5 is a schematic illustration of a fifth embodiment of a hybrid powertrain for a vehicle.

Referring to FIG. 5, a vehicle 210A with a hybrid powertrain 212A is shown that is alike in every aspect to hybrid powertrain 212 of FIG. 4, except that an elastic member, i.e., spring 250A with first and second end portions 252A, 258A, an input brake 254A, a one-way torque-transmitting mechanism 256A, a one-way clutch 255A, and clutch 259A are mounted on motor shaft 247A, replacing the similar components spring 250, input brake 254, one-way torque-transmitting mechanism 256, one-way clutch 255, and clutch 259 mounted on crankshaft 217 of FIG. 4. The spring 250A, input brake 254A, one-way torque-transmitting mechanism 256A, one-way clutch 255A, and clutch 259A operate in the same manner as described above with respect to components spring 250, input brake 254, one-way torque-transmitting mechanism 256, one-way clutch 255, and clutch 259 to enable winding of the spring 250A and subsequent release to assist in starting the engine 214. Motor/generator 240A is similar to motor/generator 240, and is connected to crankshaft 217 via the rotatable elements 260, 262 and endless rotatable device 264. Motor/generator 240A includes a rotor 244A connected to motor shaft 247A and a stator 242 grounded to the stationary member 246. The powertrain 110A operates in the same manner, except that the spring 250A is wound forward by the engine through the rotatable elements 260, 262.

Accordingly, a method of starting an engine in a hybrid vehicle having at least one motor/generator may be applied to any of the powertrain embodiments described above with respect to FIGS. 1-4. The method will be described with respect to FIG. 1, and includes winding an elastic member (torsion spring 50) that is operatively connected to a crankshaft 17 of the engine 14 using torque provided by motor/generator 40A. The method may include engaging a selectively engagable torque-transmitting mechanism, such as input brake 54, to hold the wound torsion spring 50 prior to starting the engine 14. Alternatively, if torque due to engine friction and compression of the stopped engine 14 is sufficient to hold the wound spring 50, the input brake 54 may not be required. The method further includes releasing the wound elastic member (torsion spring 50) to assist in starting the engine 14. If an input brake 54 has been engaged to hold the wound spring 50, then the releasing includes disengaging the input brake 54. In some embodiments, the winding of the spring is in a direction of forward rotation of the crankshaft and is accomplished using torque of the engine, such as in the embodiments of FIGS. 3 and 4. In other embodiments, the winding of the elastic member is in a direction opposite forward rotation of the crankshaft, and is accomplished using torque of the motor/generator, such as in the embodiments of FIGS. 1, 2 and 5.

While the best modes for carrying out the invention have been described in detail, those familiar with the art to which this invention relates will recognize various alternative designs and embodiments for practicing the invention within the scope of the appended claims.

The invention claimed is:

1. A hybrid powertrain for a vehicle comprising:
an engine having a crankshaft;
a motor/generator operatively connected to the crankshaft;
an elastic member operatively connected to the crankshaft and configured to be wound by one of the engine or the motor/generator;
a one-way torque-transmitting mechanism operatively connected to a first end portion of the elastic member and configured to overrun prior to winding of the elastic member;
a selectively engagable brake operatively connected to a second end portion of the elastic member and selectively engagable to ground the second end portion to a stationary member thereby holding the wound elastic member at engine shutoff; and
wherein the elastic member is configured to be releasable to allow unwinding of the elastic member to rotate the crankshaft to restart the engine.

2. The hybrid powertrain of claim 1, further comprising:
a motor shaft extending from the motor/generator; and
an endless rotatable device connecting the motor shaft for rotation with the crankshaft.

3. The hybrid powertrain of claim 1, wherein the motor/generator is operable to wind the elastic member backward relative to forward rotation of the crankshaft.

4. The hybrid powertrain of claim 1, wherein the elastic member, the one-way torque-transmitting mechanism and the selectively engagable brake are positioned on the motor shaft.

5. The hybrid powertrain of claim 1, wherein the elastic member, the one-way torque-transmitting mechanism and the selectively engagable brake are positioned for winding of the elastic member via the crankshaft.

6. The hybrid powertrain of claim 1, wherein the engine is operable to wind the elastic member in a forward direction of rotation of the crankshaft.

7. The hybrid powertrain of claim 1, wherein the motor/generator is a first motor/generator, and further comprising:
a transmission having an input member, an output member and a gearing arrangement; wherein the engine is operatively connected to the input member;
a second motor/generator; wherein the first and second motor/generators are operatively connected to the input member and the output member through the transmission gearing arrangement in a power-split arrangement; wherein the second motor/generator is operable for propelling the output member when the engine is off in an electric-only mode of operation, torque of the unwinding elastic member thereby substantially eliminating reaction load provided by the second motor/generator during engine restarting.

8. The hybrid powertrain of claim 1, wherein the one-way torque-transmitting mechanism is a one-way brake operable for grounding the first end portion of the elastic member to a stationary member.

9. The hybrid powertrain of claim 8, further comprising:
a one-way clutch configured to overrun when the crankshaft rotates in a forward direction faster than the second end portion of the elastic member and to lock when the crankshaft does not rotate in a forward direction faster than the second end portion of the elastic member; and
a selectively engagable clutch configured to connect the first end portion of the elastic member for rotation with the crankshaft when engaged.

10. The hybrid powertrain of claim 8, further comprising:
a one-way clutch configured to overrun when the motor/generator rotates in a forward direction faster than the second end portion of the elastic member and to lock when the motor/generator does not rotate in a forward direction faster than the second end portion of the elastic member; and
a selectively engagable clutch configured to connect the first end portion of the elastic member for rotation with the motor/generator when engaged.

11. A method of starting an engine on a hybrid vehicle having an engine and at least one motor/generator, comprising:
winding an elastic member operatively connected to a crankshaft of the engine using torque provided by one of the engine and the motor/generator; wherein said winding is in a direction that causes a one-way torque-transmitting mechanism to hold one end of the elastic member stationary;
engaging a selectively engagable torque-transmitting mechanism via a controller to hold the wound elastic member prior to starting the engine;
releasing the wound elastic member to assist in starting the engine; and
wherein the wound elastic member is released by disengaging the torque-transmitting mechanism to allow said one end of the elastic member to overrun at the one-way torque-transmitting mechanism.

12. The method of claim 11, wherein said direction is opposite forward rotation of the crankshaft and is accomplished using torque of the motor/generator.

13. The method of claim 11, wherein the winding is in a direction of forward rotation of the crankshaft and is accomplished using torque of the engine.

14. A hybrid powertrain for a vehicle comprising:
an engine having a crankshaft;
a motor/generator operatively connected to the crankshaft;
an elastic member operatively connected to the crankshaft and configured to be wound by one of the engine or the motor/generator;
a motor shaft extending from the motor/generator;
an endless rotatable device connecting the motor shaft for rotation with the crankshaft;
a one-way torque-transmitting mechanism operatively connected to a first end portion of the elastic member and configured to overrun prior to winding of the elastic member; and
wherein the elastic member is configured to be releasable to allow unwinding of the elastic member to rotate the crankshaft to restart the engine.

* * * * *